United States Patent
Higuchi et al.

(10) Patent No.: US 11,408,745 B2
(45) Date of Patent: Aug. 9, 2022

(54) METHODS AND SYSTEMS FOR IDENTIFYING SAFE PARKING SPACES

(71) Applicant: Toyota Motor Engineering & Manufacturing North America, Inc., Plano, TX (US)

(72) Inventors: Takamasa Higuchi, Mountain View, CA (US); Kentaro Oguchi, Mountain View, CA (US)

(73) Assignee: Toyota Motor Engineering & Manufacturing North America, Inc, Plano, TX (US)

(*) Notice: Subject to any disclaimer, the term of this patent is extended or adjusted under 35 U.S.C. 154(b) by 0 days.

(21) Appl. No.: 17/169,157

(22) Filed: Feb. 5, 2021

(65) Prior Publication Data

US 2022/0136847 A1 May 5, 2022

Related U.S. Application Data

(60) Provisional application No. 63/107,156, filed on Oct. 29, 2020.

(51) Int. Cl.
  *G01C 21/34* (2006.01)
  *G06F 16/9536* (2019.01)
  *G08G 1/14* (2006.01)
(52) U.S. Cl.
  CPC ..... *G01C 21/3461* (2013.01); *G06F 16/9536* (2019.01); *G08G 1/144* (2013.01); *G08G 1/148* (2013.01)
(58) Field of Classification Search
  CPC .................................................. G01C 21/3461
  See application file for complete search history.

(56) References Cited

U.S. PATENT DOCUMENTS

| | | |
|---|---|---|
| 9,576,250 B2 | 2/2017 | de Souza et al. |
| 9,704,401 B2 | 7/2017 | Akavaram et al. |

(Continued)

FOREIGN PATENT DOCUMENTS

| | | |
|---|---|---|
| CN | 101193459 A | 6/2008 |
| CN | 102030008 A | 4/2011 |

(Continued)

OTHER PUBLICATIONS

Tekouabou et al., "Improving Parking Availability Prediction in Smart Cities with IoT and Ensemble-based Model", 11 pages, https://www.sciencedirect.com/science/article/pii/S1319157819312613#bb0175.

(Continued)

*Primary Examiner* — Travis R Hunnings
(74) *Attorney, Agent, or Firm* — Dinsmore & Shohl LLP

(57) ABSTRACT

A method comprises determining a plurality of available parking spaces within a threshold distance of a destination; determining an initial utility score for each of the available parking spaces based on a distance between each of the available parking spaces and the destination; determining a safety score associated with each of the available parking spaces based on crime data and a distance between each of the parking spaces and a major street, an entrance to a parking facility in which each available parking space is located, or an entrance to a point of interest; determining an adjusted utility score for each of the available parking spaces based on the initial utility score and the safety score associated with each of the available parking spaces; and selecting a parking space among the plurality of available parking spaces based on the adjusted utility score for the parking space.

20 Claims, 5 Drawing Sheets

(56) References Cited

U.S. PATENT DOCUMENTS

| | | |
|---|---|---|
| 9,959,761 B2 | 5/2018 | Tsyrklevich |
| 10,290,073 B2 | 5/2019 | Amir |
| 2008/0130922 A1 | 6/2008 | Shibata et al. |
| 2011/0083075 A1 | 4/2011 | MacNeille et al. |
| 2011/0133957 A1 | 6/2011 | Harbach et al. |
| 2016/0117925 A1 | 4/2016 | Akavaram et al. |
| 2018/0225969 A1* | 8/2018 | Baughman ............. G01C 21/28 |
| 2018/0301031 A1 | 10/2018 | Naamani et al. |
| 2018/0313660 A1 | 11/2018 | Eyster et al. |
| 2018/0313661 A1* | 11/2018 | Eyster .................... G08G 1/144 |
| 2019/0066505 A1* | 2/2019 | Salvucci ................. G07F 17/24 |
| 2019/0094038 A1 | 3/2019 | Oh et al. |
| 2019/0251973 A1 | 8/2019 | Kume |
| 2020/0191587 A1* | 6/2020 | Fuchs ................ G01C 21/3446 |

FOREIGN PATENT DOCUMENTS

| | | | |
|---|---|---|---|
| JP | 2002199499 A | 7/2002 |
| JP | 2005190192 A | 7/2005 |
| JP | 2006284454 A | 10/2006 |
| JP | 2008001247 A | 1/2008 |

OTHER PUBLICATIONS

Tooraj Tajabioun and Petros A. Ionannou, "On-Street and Off-Street Parking Availability Prediction Using Multivariate Spatiotemporal Models," IEEE Transactions on Intelligent Transportaion Systems, vol. 16, No. 5, 12 pages.

\* cited by examiner

METHODS AND SYSTEMS FOR IDENTIFYING SAFE PARKING SPACES

CROSS-REFERENCE TO RELATED APPLICATION

This application claims priority to U.S. Provisional Application No. 63/107,156, filed on Oct. 29, 2020, the entire contents of which is hereby incorporated by reference.

TECHNICAL FIELD

The present specification relates to identifying available parking spaces, and more particularly, to methods and systems for identifying safe parking spaces.

BACKGROUND

Wasted time while searching for a parking space has been a societal issue for decades. Connected vehicles with navigation systems may guide drivers to available parking spaces. However, certain parking spaces may be unsafe and may expose drivers and their vehicles to higher rates of theft or vandalism or other crimes if they were to park at such unsafe parking spaces. Accordingly, a need exists for methods and systems for identifying safe parking spaces.

SUMMARY

In one embodiment, a method may include determining a plurality of available parking spaces within a threshold distance of a destination of a user associated with a vehicle, determining an initial utility score for each of the available parking spaces based at least in part on a distance between each of the available parking spaces and the destination, determining a safety score associated with each of the available parking spaces based at least in part on crime data and based at least in part on a distance between each of the parking spaces and a major street, an entrance to a parking facility in which each of the available parking spaces is located, or an entrance to a point of interest, determining an adjusted utility score for each of the available parking spaces based on the initial utility score for each of the available parking spaces and the safety score associated with each of the available parking spaces, selecting a parking space among the plurality of available parking spaces based on the adjusted utility score for the parking space, and transmitting a location of the selected parking space to the user.

In another embodiment, a server may include a controller configured to determine a plurality of available parking spaces within a threshold distance of a destination of a user associated with a vehicle, determine an initial utility score for each of the available parking spaces based at least in part on a distance between each of the available parking spaces and the destination, determine a safety score associated with each of the available parking spaces based at least in part on crime data and based at least in part on a distance between each of the parking spaces and a major street, an entrance to a parking facility in which each of the available parking spaces is located, or an entrance to a point of interest, determine an adjusted utility score for each of the available parking spaces based on the initial utility score for each of the available parking spaces and the safety score associated with each of the available parking spaces, select a parking space among the plurality of available parking spaces based on the adjusted utility score for the parking space, and transmit a location of the selected parking space to the user.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include systems and methods for identifying safe parking spaces. When a driver of a vehicle needs to park the vehicle using public parking, a number possible parking spaces may be available. A parking assistance system may be able to direct the driver of the vehicle to an available parking space. A number of criteria may be used by the parking assistance system to select a parking space that the driver is directed to, such as a distance between a parking space and the driver's desired destination. However, certain parking spaces may be less safe than others (e.g., they may be in high crime areas). Accordingly, a driver may prefer that the parking assistance system direct the driver to a safer parking space as opposed to a less safe parking space.

Accordingly, as disclosed herein, a parking assistance system may receive a request from a vehicle for parking assistance and may select a parking space and direct the vehicle to the selected parking space. When selecting a parking space, the parking assistance system may initially identify a plurality of available parking spaces and may assign an initial utility score to each available parking space. The initial utility score for each parking space may be based on a number of factors such as a distance to a destination, parking fee, etc.

After determining an initial utility score, the parking assistance system may determine an adjusted utility score for each available parking based on one or more safety scores. The safety scores may be determined based on a variety of factors including sensor data from vehicles, crime data, online reviews of parking facilities, and domain knowledge. The adjusted utility score may also be based on user preferences (e.g., how much to weigh safety scores in determining a parking space). In some examples, the parking assistance system may determine user preferences based on past parking history of the user.

After determining adjusted utility scores for each of the available parking spaces, the parking assistance system may select the available parking space with the highest adjusted utility score. The parking assistance system may then direct the vehicle to the selected parking space.

Figure 1:
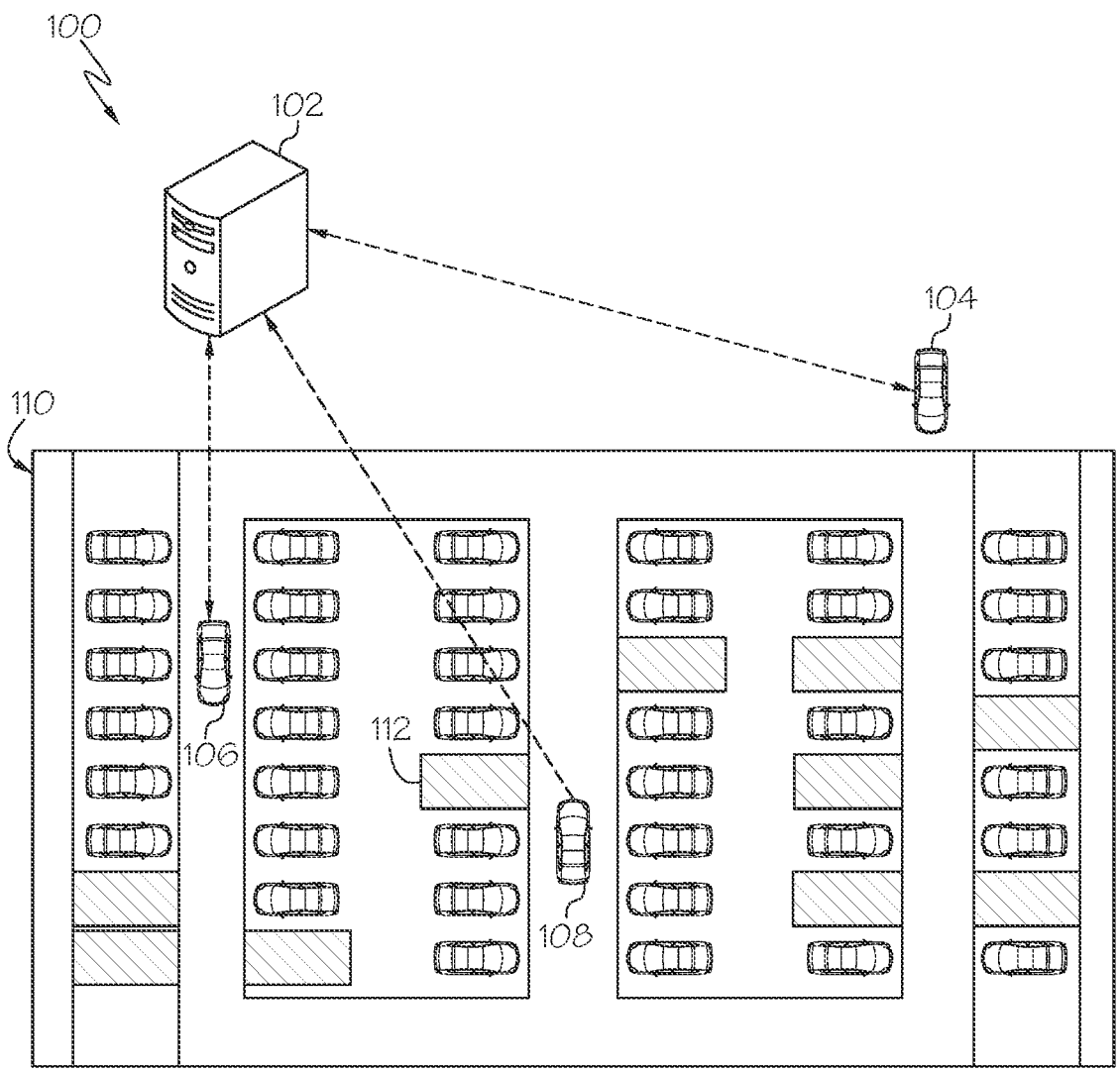
FIG. 1 schematically depicts a system for identifying safe parking spaces, according to one or more embodiments shown and described herein.

Turning now to the figures, FIG. 1 schematically depicts a parking assistance system 100 for identifying safe parking spaces. The system 100 includes a server 102 and one or more connected vehicles 104, 106, 108. In the example of FIG. 1, the system 100 includes three connected vehicles. However, in other examples, it should be understood that the system 100 may include any number of connected vehicles. The connected vehicles 104, 106, 108 may be communicatively coupled to the server 102, as disclosed herein. Each of the connected vehicles 104, 106, 108 may be human driven and/or autonomously driven vehicles. Each of the connected vehicles 104, 106, 108 may be an automobile or any other passenger or non-passenger vehicle such as, for example, a terrestrial, aquatic, and/or airborne vehicle including, but not limited to, a bus, a scooter, a drone, and a bicycle. In some embodiments, one or more of the connected vehicles 104, 106, 108 may be an autonomous vehicle that navigates its environment with limited human input or without human input.

In the example of FIG. 1, connected vehicles 106, 108 are positioned in a parking lot 110 and the connected vehicle 104 approaches the parking lot 110. The vehicle 104 may request parking assistance from the server 102. The server 102 may determine available parking spaces in the parking lot 110 and may select an available parking space, using the techniques described herein. The server 102 may then determine a route between the vehicle 104 and the select parking space and may transmit the determined route to the vehicle 104 and/or direct the vehicle 104 to the selected parking space (e.g., using a navigation system of the vehicle 104).

While the example of FIG. 1 shows the server 102 selecting a parking space in the parking lot 110, it should be understood that in other examples, the server 102 may select a parking space from among a plurality of parking facilities. For example, the driver of the vehicle 104 may request parking assistance while driving to a concert. The driver may input the desired destination (e.g., the location of the concert), and the server 102 may determine a parking space from among a plurality of available parking spaces located in a plurality of parking facilities in the vicinity of the destination.

The server 102 may receive data from one or more connected vehicles, such as the vehicles 104, 106, 108, as disclosed herein. A vehicle requesting parking assistance (e.g., the vehicle 104 in FIG. 1) may communicate with the server 102 to transmit a request for parking assistance and to a location and route guidance to a selected parking space. In addition, the server 102 may receive data from other connected vehicles that are not requesting parking assistance (e.g., the vehicles 106, 108 in FIG. 1). For example, these other connected vehicles may transmit sensor data to the server 102, which the server 102 may use to determine live parking availability, as disclosed herein.

Figure 2:
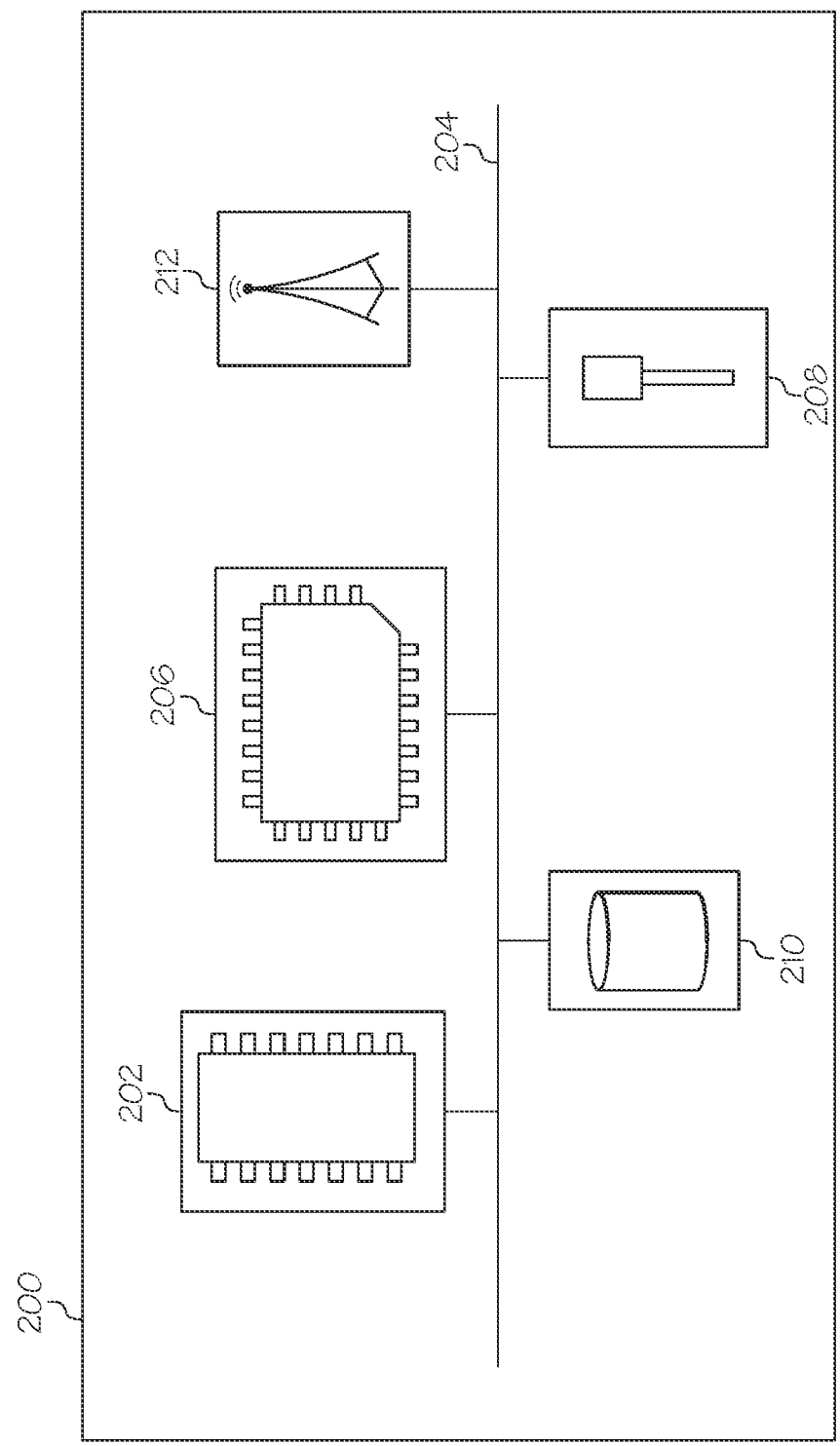
FIG. 2 depicts a schematic diagram of a vehicle system, according to one or more embodiments shown and described herein.

FIG. 2 depicts a vehicle system 200 included in the vehicles 104, 106, 108 of FIG. 1. The vehicle system 200 includes one or more processors 202, a communication path 204, one or more memory modules 206, a satellite antenna 208, one or more vehicle sensors 210, and network interface hardware 212, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the location of vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more sensors 210 may include, but are not limited to, LiDAR sensors, RADAR sensors, optical sensors (e.g., cameras, laser sensors, proximity sensors, location sensors (e.g., GPS modules)), and the like. In embodiments, the sensors 210 may monitor the surroundings of the vehicle and may detect available parking spaces. For example, in the example of FIG. 1, the vehicle 108 may detect available parking space 112 in the parking lot 110. In some examples, the vehicle sensor 210 may include a feature extraction module (not shown), which may extract features from images captured by a vehicle sensor 210 (e.g., a camera) to detect available parking spaces.

In addition to detecting available parking spaces, the sensors 210 may also detect other features associated with parking spaces (e.g., based on captured image data). For example, the sensors 210 may detect lighting conditions near parking spaces, graffiti on walls near parking spaces, trash on the ground, as well as people and other vehicles near parking spaces. These features may be used by the server 102 to determine a safety level of parking spaces, as disclosed in further detail below.

For autonomous vehicles, the vehicle system 200 may include an autonomous driving module (not shown) and the data gathered by the sensors 210 may be used by the autonomous driving module to autonomously navigate the vehicle. In both autonomous and non-autonomous connected vehicles, the data gathered by the sensors 210 may be used to manage connected vehicles, as disclosed in further detail below.

Still referring to FIG. 2, the vehicle system 200 comprises network interface hardware 212 for communicatively coupling the vehicle system 200 to the server 102 and/or another vehicle system. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit sensor data gathered by the sensors 210 to the server 102. The network interface hardware 212 may also transmit a request for parking assistance to the server 102. The network interface hardware 212 may also receive, from the server 102, information about a selected parking space in response to a parking assistance request (e.g., a location of a parking space or a navigation route to the parking space).

The vehicle system 200 may also include an interface (not shown). The interface may allow for data to be presented to a driver and for data to be received from the driver. For example, the interface may include a screen to display information to a driver, speakers to present audio information to the driver, and a touch screen that may be used by the driver to input information. In other examples, the vehicle system 200 may include other types of interfaces. An interface of the vehicle system 200 may be used by the driver to request parking assistance from the server 102. For example, the driver may use a touch screen to input a destination for which parking is desired. In another example, a screen may display navigation information to direct a driver to a parking space selected by the server 102.

In some embodiments, the vehicle system 200 may be communicatively coupled to the server 102 by a network (not shown). In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Figure 3:
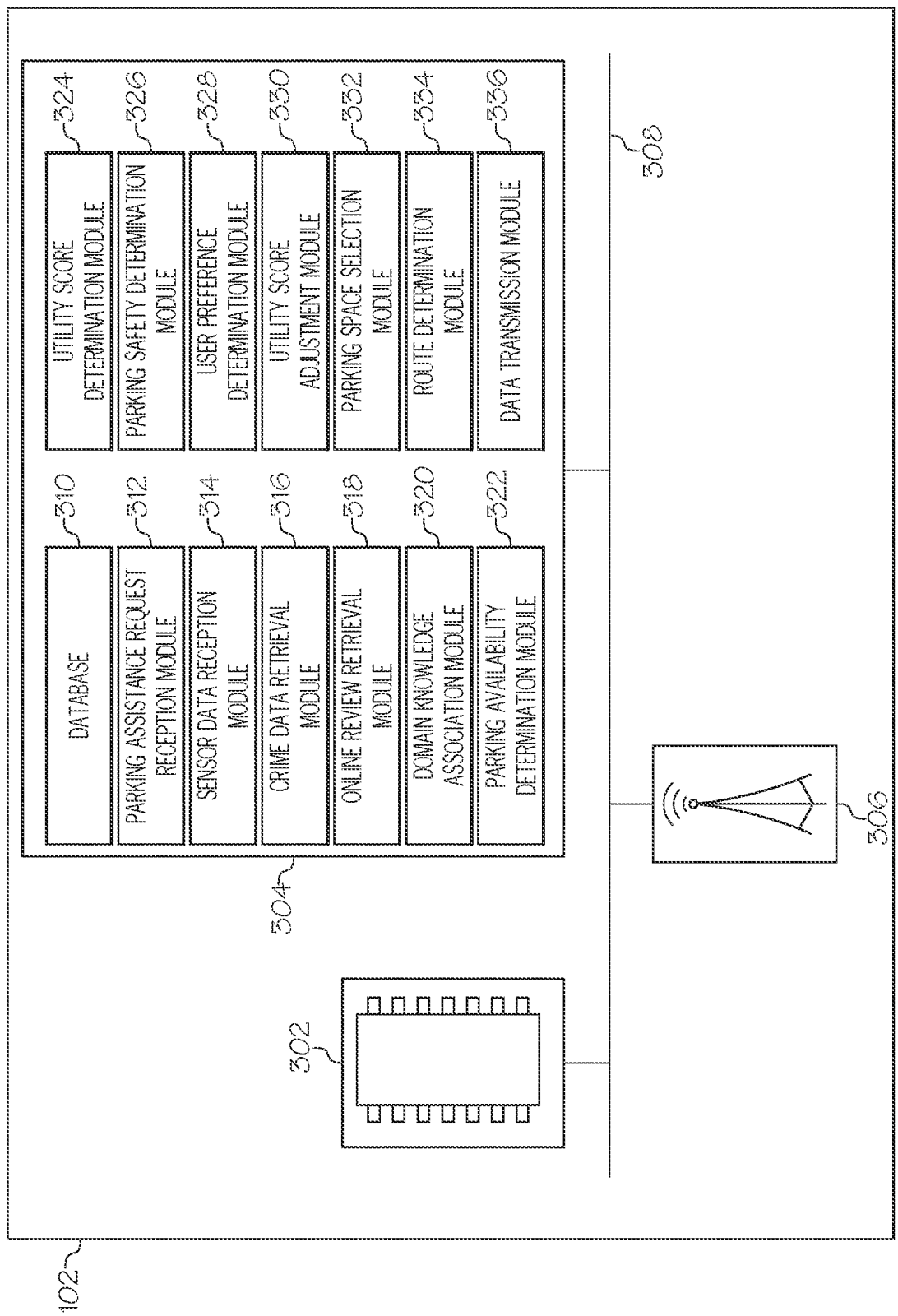
FIG. 3 depicts a schematic diagram of a server that may be part of the system of FIG. 1, according to one or more embodiments shown and described herein.

Now referring to FIG. 3, a schematic diagram of the server 102 is shown. In some examples, the server 102 may be positioned near one or more parking facilities (e.g., an edge server). In other examples, the server 102 may be a cloud server. In other examples, the server 102 may comprise any other suitable computing system.

In the example of FIG. 3, the server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the server 102 may transmit and receive data to and from connected vehicles (e.g., vehicles 104, 106, 108 of FIG. 1).

The one or more memory modules 304 include a database 310, a parking assistance request reception module 312, a sensor data reception module 314, a crime data retrieval module 316, an online review retrieval module 318, a domain knowledge association module 320, a parking availability determination module 322, a utility score determination module 324, a parking safety determination module 326, a user preference determination module 328, a utility score adjustment module 330, a parking space selection module 332, a route determination module 334, and a data transmission module 336. Each of the database 310, the parking assistance request reception module 312, the sensor data reception module 314, the crime data retrieval module 316, the online review retrieval module 318, the domain knowledge association module 320, the parking availability determination module 322, the utility score determination module 324, the parking safety determination module 326, the user preference determination module 328, the utility score adjustment module 330, the parking space selection module 332, the route determination module 334, and the data transmission module 336 may be a program module in the form of operating systems, application program modules, and other program modules stored in one or more memory modules 304. In some embodiments, the program module may be stored in a remote storage device that may communicate with the server 102. In some embodiments, one or more of the database 310, the parking assistance request reception module 312, the sensor data reception module 314, the crime data retrieval module 316, the online review retrieval module 318, the domain knowledge association module 320, the parking availability determination module 322, the utility score determination module 324, the parking safety determination module 326, the user preference determination module 328, the utility score adjustment module 330, the parking space selection module 332, the route determination module 334, and the data transmission module 336 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 310 may temporarily and/or permanently store a variety of data used by the memory modules 304 and/or other components of the server 102. The data stored in the database is discussed in further detail below.

The parking assistance request reception module 312 may receive a request for parking assistance from a connected vehicle (e.g., vehicle 104 of FIG. 1). The request for parking assistance may comprise a current location of the requesting vehicle and a desired destination. The desired destination may be a location where a driver of the vehicle wishes to park. In some examples, the request for parking assistance may also comprise information about the connected vehicle (e.g., the size of the vehicle or driving capabilities of the vehicle such as a turning radius). The server 102 may determine an available parking space for the vehicle based on the request for parking assistance using the techniques described herein.

The sensor data reception module 314 may receive sensor data from one or more connected vehicles (e.g., vehicles 104, 106, 108 of FIG. 1). The sensor data received by the sensor data reception module 314 may comprise sensor data captured by the sensors 210 of one of more vehicle systems 200. In embodiments, the sensor data reception module 314 may receive images and/or features extracted from images captured by the sensors 210 of one or more vehicle systems 200. The sensor data received by the sensor data reception module 314 may be used to identify available parking spaces, as described in further detail below.

The sensor data received by the sensor data reception module 314 may also be used to identify features associated with a parking space or with an area in which a parking space is located. For example, the sensor data received by the sensor data reception module 314 may determine the lighting conditions around a parking space or the number of pedestrians around a parking space, as described above. The identified features may be used by the server 102 to determine safety of parking spaces, as described in further detail below.

The crime data retrieval module 316 may retrieve crime data associated with an area in which an available parking space is located. The crime data retrieval module 316 may retrieve crime data from an external server (e.g., a government server that stores publicly available crime data). The crime data may include a date, time, and location of reported crimes, as well as other reported information about the crimes. As such, the crime data retrieval module 316 may determine the frequency of criminal activity around parking spaces. After the crime data retrieval module 316 retrieves crime data associated with a particular area, the crime data may be stored in the database 310.

In some examples, the crime data retrieval module 316 may retrieve crime data comprising crime rates associated with a location in which an available parking space is located. In particular, the crime data retrieval module 316 may retrieve crime data comprising crime rates associated with vehicles (e.g., vehicle theft or vehicle vandalism). This type of crime data may be of particular importance to a driver when deciding where to park. In embodiments, the crime data retrieved by the crime data retrieval module 316 may be compiled from government crime records (e.g., police reports, FBI data, and the like). The crime data retrieval module 316 may retrieve crime data directly from a government source (e.g., a government server) or from one or more non-government sources that have compiled crime data.

In some examples, the crime data retrieval module 316 may retrieve crime data associated with certain dates or times. For example, crime data may indicate that a certain location has a higher crime rate at night or on weekends. The crime data retrieved by the crime data retrieval module 316 may be used to determine safety of a parking space, as disclosed herein.

The online review retrieval module 318 may retrieve online reviews of parking facilities. Certain third-party services (e.g., web-based services such as Google Maps® or Yelp®) may allow users of parking facilities to post reviews of those facilities. The posted reviews of these services may be aggregated such that other users may view the reviews. Each review of a parking facility may include a rating (e.g., 1-5 stars) as well as comments about the parking facility. In embodiments, the online review retrieval module 318 may access a server, a website, or other database that stores such online reviews and may download user reviews associated with a parking facility. In some examples, the online review retrieval module 318 may download reviews posted on social media sites. The downloaded reviews may be stored in the database 310.

The online review retrieval module 318 may then parse the comments associated with reviews of a parking facility to determine relative safety of the parking facility. In particular, the online review retrieval module 318 may search online reviews for comments indicating an unsafe atmosphere or criminal events. For example, certain reviews may mention that there is graffiti on the walls or the parking facility is poorly lit, which may indicate a less safe parking facility. The comments in online reviews of parking facilities as well as the ratings of the parking facilities may be stored in the database 310.

The domain knowledge association module 320 may associate certain features of parking facilities with domain knowledge related to parking facility safety. The domain knowledge may be stored in the database 310. For parking spaces close to surveillance cameras, close to street lamps, close to major streets, close to a parking facility entrance, or close to an entrance to a point of interest may be presumed to have relatively high safety. The server 102 may determine certain features of a parking space (e.g., based on data received by the sensor data reception module 314 and/or from publicly available data) and the domain knowledge association module 320 may associate those features with a safety level using domain knowledge stored in the database 310 to determine a safety level of the parking space. The domain knowledge association module 320 may also include temporal variations in safety. For example, areas with poor lighting may be less safe at night but relatively safe during the daytime when the sun is out.

The parking availability determination module 322 may determine one or more available parking spaces. As discussed above, a request for parking assistance received by the parking assistance request reception module 312 from a connected vehicle may include a desired destination. Accordingly, the parking availability determination module 322 may determine one or more available parking spaces based on the desired destination. In one example, the parking availability determination module 322 may identify available parking spaces within a predetermined threshold distance from the desired destination. In some examples, the threshold distance may be user-selectable.

In embodiments, the parking availability determination module 322 may determine available parking spaces based on data received by the sensor data reception module 314 from one or more connected vehicles. As discussed above, sensors of connected vehicles may capture images or other sensor data that may be used to identify available parking spaces. Connected vehicles may also transmit their current location along with the sensor data. Thus, the parking availability determination module 322 may determine available parking spaces based on sensor data received by connected vehicles and the received locations of the connected vehicles.

For example, in the example of FIG. 1, the vehicle 108 may capture an image of available parking space 112, and the vehicle 108 may identify that the parking space is available using image processing techniques. Alternatively, the vehicle 108 may transmit the raw data to the server 102 and the parking availability determination module 322 may determine that the parking space is available using image processing techniques. The parking availability determination module 322 may also determine other information about parking spaces based on the sensor data received by the sensor data reception module 314 (e.g., the size of a parking space, the amount of space around a parking space, etc.).

By receiving sensor data from a plurality of connected vehicles located in a plurality of locations, the parking availability determination module 322 may determine live parking availability at a plurality of locations. In the example of FIG. 1, the server 102 receives sensor data from vehicles 106 and 108, which are located at different positions in the parking lot 110. However, in other examples, the server 102 may receive sensor data from connected vehicles positioned at multiple parking facilities. Thus, the parking availability determination module 322 may be able to determine parking availability at a wide variety of parking facilities over a large geographic area.

In some examples, the parking availability determination module 322 may rely on information other than vehicle sensor data to determine available parking spaces. For example, some parking garages may broadcast the number of parking spaces currently available in the garage. Accordingly, the parking availability determination module 322 may receive such data and identify available parking spaces based on such data. Other publicly available data may be used by the parking availability determination module 322 to gather information about parking spaces including publicly listed parking fees.

The utility score determination module 324 may determine an initial utility score for each the available parking spaces determined by the parking availability determination module 322. The initial utility score may be determined based on a number of factors associated with an available parking space including a distance to a desired destination, a parking fee, the size of a parking space, the ease of maneuvering into a parking space (e.g., based on surrounding vehicles), and the like.

In some examples, as discussed above, a request for parking assistance received by the parking assistance request reception module 312 may include information about the vehicle to be parked (e.g., the size of the vehicle, the turning radius of the vehicle, and the like). In these examples, the utility score determination module 324 may determine the initial utility score based in part on the information about the vehicle to be parked. For example, if a large vehicle is to be parked, the utility score determination module 324 may assign a lower utility score to smaller parking spaces. Alternatively, if a vehicle to be parked has a larger turning radius, the utility score determination module 324 may assign a lower utility score to parking spaces that require a tighter turn to enter.

The utility score determination module 324 may determine an initial utility score for an available parking space by weighting one or more factors, such as the factors discussed above. In some examples, a predetermined weighting may be used for a plurality of factors. In other examples, a user may specify the weights to be applied to different factors. For example, a user may determine that the distance from the desired destination is less important but the parking fee is more important. Alternatively, another user may determine that the parking fee is less important but the distance from the desired destination is more important.

The parking safety determination module 326 may determine a safety score associated with each of the available parking spaces identified by the parking availability determination module 322. A safety score for a particular parking space may comprise a likelihood of a crime occurring in the vicinity of the parking space. In embodiments, the parking safety determination module 326 may determine a safety score for a parking space based on the data received by the sensor data reception module 314, the data received by the crime data retrieval module 316, the data received by the online review retrieval module 318, and operations performed by the domain knowledge association module 320. As discussed above, each of the sensor data reception module 314, the crime data retrieval module 316, the online review retrieval module 318, and the domain knowledge association module 320 may gather certain data associated with parking space safety. The parking safety determination module 326 may aggregate the data from each of the sensor data reception module 314, the crime data retrieval module 316, the online review retrieval module 318, and the domain knowledge association module 320. The parking safety determination module 326 may then weigh the aggregated data and determine a safety score for each of the parking spaces identified by the parking availability determination module 322.

The user preference determination module 328 may determine user preferences associated with safety. In particular, the user preference determination module 328 may determine a user's sensitivity to safety when parking. A user's sensitivity to safety may comprise how strongly a user considers safety when parking. For example, one user may be highly sensitive to safety and may prefer a relatively safer parking space even if it is further from the desired destination. Another user may be less sensitive to safety and may prefer a parking space closer to the desired destination even if it is relatively less safe.

In some examples, a user may directly input their preference with respect to their sensitivity to safety. For example, a user may utilize an input of the vehicle system 200 to input a value indicating how highly the user rates safety. This user selected value may be stored in the vehicle system 200 and/or the database 310 of the server 102. In these examples, the user preference determination module 328 may access this user determined value to determine a user's sensitivity to safety. In other examples, the user preference determination module 328 may automatically determine a user's sensitivity to safety when parking without direct input from the user, using the techniques described below.

In embodiments, the user preference determination module 328 may access a user's parking history. In some examples, the server 102 may detect every time that a connected vehicle parks. For example, the server 102 may detect vehicle shift conditions, vehicle accelerometer readings, or may detect when a vehicle's engine is turned off in order to determine when a vehicle is parked. The server 102 may then store a vehicle location in the database 310 every time that a connected vehicle parks. In these examples, the user preference determination module 328 may access a parking history of a vehicle from the database 310. In other examples, the user preference determination module 328 may receive a history of vehicle parking locations directly from the vehicle system 200 of the vehicle.

After the user preference determination module 328 determines a history of parking locations utilized by a user, the parking safety determination module 326 may determine a safety score of each of the parking locations utilized by the user, using the techniques described above. In some examples, the parking safety determination module 326 may determine the safety score at the date and time at which the vehicle was parked in order to account for temporal variations. The user preference determination module 328 may then determine the user's sensitivity to safety based on the safety level of the parking locations used by the user. For example, if the user routinely parks in parking spaces having a high safety score, the user may have a high sensitivity to safety. Alternatively, if the user routinely parks in parking spaces having a low safety score, the user may have low sensitivity to safety. In embodiments, the user preference determination module 328 may store a value indicating a user's sensitivity to safety in the database 310.

In some examples, the user preference determination module 328 may determine a minimum safety score threshold associated with a user based on the user's parking history. For example, the user preference determination module 328 may determine the parking location previously utilized by the user having the lowest safety score and may set that safety score as a threshold. In other examples, the user preference determination module 328 may determine an average safety score of previous parking locations utilized by the user to determine the user's safety sensitivity. In some examples, the user preference determination module 328 may determine that a user's safety sensitivity changes based on the date and time (e.g., a user may be more sensitive to safety at night).

The utility score adjustment module 330 may adjust the initial utility score determined by the utility score determination module 324 for each of the parking spaces identified by the parking availability determination module 322 based on the safety scores determined by the parking safety determination module 326 and the user preferences determined by the user preference determination module 328. More specifically, the utility score adjustment module 330 may combine the initial utility score determined by the utility score determination module 324 and the safety score determined by the parking safety determination module 326 to determine an adjusted utility score, as disclosed herein.

When combining the initial utility score and the safety score to determine an adjusted utility score, the utility score adjustment module 330 may weigh the initial utility score and the safety score based on the user's safety sensitivity determined by the user preference determination module 328. For example, if a user has high safety sensitivity, the safety score determined by the parking safety determination module 326 may be weighted highly when determining the adjusted utility score. Alternatively, if a user has low safety sensitivity, the safety score determined by the parking safety determination module 326 may not be weighted as highly when determining the adjusted utility score. Thus, the utility score adjustment module 330 may consider the safety of a parking space and other factors associated with the parking space (e.g., a distance to a destination) in appropriate amounts according to the preferences of a user.

The parking space selection module 332 may select a parking space for a user requesting parking assistance based on the adjusted utility score determined by the utility score adjustment module 330. Specifically, the parking space selection module 332 may select the available parking space form among the one or more available parking spaces determined by the parking availability determination module 322 having the highest adjusted utility score, as determined by the utility score adjustment module 330. In some examples, the parking space selection module 332 may only consider available parking spaces having a safety score above a certain threshold (e.g., a minimum safety score threshold determined by the user preference determination module 328). In these examples, the parking space selection module 332 may select the available parking space from among this subset of available parking spaces having the highest adjusted utility score.

The route determination module 334 may determine a navigation route between the current location of a vehicle requesting parking assistance and the parking space selected by the parking space selection module 332. As discussed above, the parking assistance request reception module 312 may receive a request for parking assistance comprising a current location of a vehicle. Thus, the route determination module 334 may determine a navigation route between the received location of the vehicle requesting parking assistance and the location of the parking space selected by the parking space selection module 332.

The data transmission module 336 may transmit data associated with the parking space selected by the parking space selection module 332 to the vehicle requesting parking assistance. Specifically, the data transmission module 336 may transmit the location of the selected parking and/or the route determined by the route determination module 334 to the vehicle requesting parking assistance.

Figure 4:
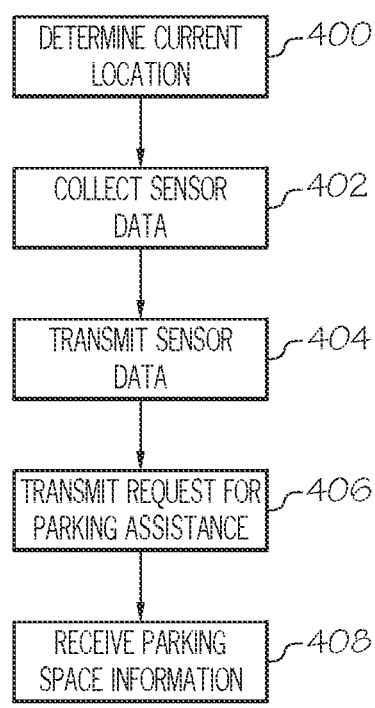
FIG. 4 depicts a flowchart for operating a vehicle that may be part of the system of FIG. 1, according to one or more embodiments shown and described herein.

FIG. 4 depicts a flowchart for identifying safe parking spaces that may be performed by the vehicle system 200 in FIG. 2 of a connected vehicle that desires parking assistance. The flowchart is described herein with reference to FIGS. 1-3. At step 400, the satellite antenna 208 of the vehicle system 200 may determine the current location of the vehicle.

At step 402, the sensors 210 may collect sensor data. The sensor data collected by the sensors 210 may include one or more images of the area surrounding the vehicle. At step 404, the network interface hardware 212 may transmit the sensor data collected by the sensors 210 to the server 102.

At step 406, the network interface hardware 212 may transmit a request for parking assistance to the server 102. The request may include the current location of the vehicle, as determined by the satellite antenna 208, as well as a desired destination specified by a user (e.g., input by the driver of the vehicle). In some examples, the request for parking assistance may also include information about the vehicle (e.g., the size of the vehicle, the turning radius of the vehicle, and the like).

At step 408, the network interface hardware 212 may receive information about a parking space selected by the server 102 in response to the request for parking assistance. The information received may include a location of the selected parking space and/or a navigation route between the vehicle's current location and the location of the selected parking space. The vehicle may then be driven to the selected parking space, either autonomously or by a human driver using the received location and/or navigation route.

Figure 5:
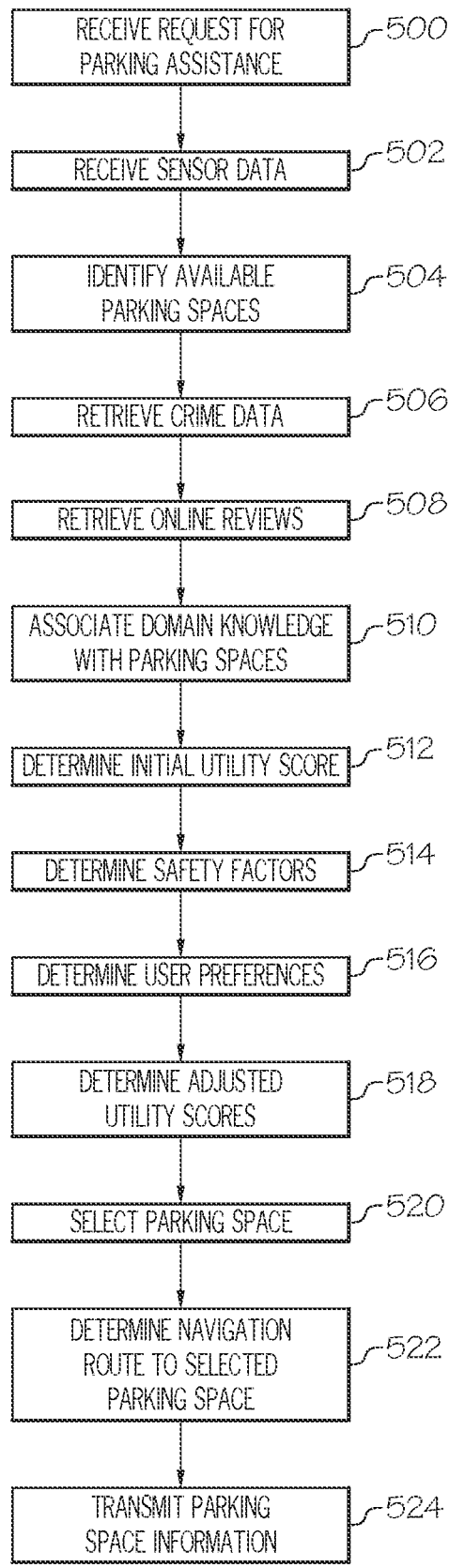
FIG. 5 depicts a flowchart for operating a server that may be part of the system of FIG. 1, according to one or more embodiments shown and described herein.

FIG. 5 depicts a flowchart for identifying safe parking spaces that may be performed by the server 102. The flowchart is described herein with reference to FIGS. 1-3. At step 500, the parking assistance request reception module 312 may receive a request for parking assistance from a connected vehicle (e.g., vehicle 104 of FIG. 1). As explained above, the request for parking assistance may include a current location of the connected vehicle and a selected destination for which parking is desired. The request for parking assistance may also include certain characteristics of the connected vehicle requesting parking assistance.

At step 502, the sensor data reception module 314 may receive sensor data from one or more connected vehicles (e.g., vehicles 106, 108 of FIG. 1). In some examples, the sensor data may comprise images and/or features extracted from images surrounding the connected vehicles. The sensor data reception module 314 may also receive locations of each of the connected vehicles from which sensor data is received.

At step 504 the parking availability determination module 322 may determine one or more available parking spaces based on the destination specified in the request for parking assistance and the sensor data received by the sensor data reception module 314. The parking availability determination module 322 may analyze the sensor data received by the sensor data reception module 314 (e.g., using image processing techniques) to identify available parking spaces. The parking availability determination module 322 may use the locations of the vehicles transmitting the sensor data to determine locations of the available parking spaces. The parking availability determination module 322 may also determine certain features associated with the identified available parking spaces based on the received sensor data (e.g., the size of the parking spaces, the number of vehicles adjacent to the parking spaces, the proximity of parking spaces to surveillance cameras or major streets, and the like). The parking availability determination module 322 may identify one or more parking spaces within a threshold distance from the destination specified in the request for parking assistance.

At step 506, the crime data retrieval module 316 may retrieve crime data associated with the geographic areas in which each of the parking spaces identified by the parking availability determination module 322 are located. At step 508, the online review retrieval module 318 may retrieve online reviews of parking facilities in which the available parking spaces identified by the parking availability determination module 322 are located.

At step 510, the domain knowledge association module 320 may associate domain knowledge with features of the one or more available parking spaces identified by the parking availability determination module 322. For example, the domain knowledge association module 320 may identify that a particular parking space is near a major street, near a parking facility entrance, or near an entrance to a point of interest.

At step 512, the utility score determination module 324 may determine an initial utility score for each of the available parking spaces identified by the parking availability determination module 322. The initial utility score may be based at least in part on the distance between the current location of the vehicle requesting parking assistance and each of the available parking spaces. The initial utility score may also be based in part on the certain identified features of each of the available parking spaces (e.g., size of a parking space, parking fee, and the like). The initial utility score may also be based in part on certain characteristics of the vehicle requesting parking assistance (e.g., the size of the vehicle).

At step 514, the parking safety determination module 326 may determine a safety score for each of the available parking spaces identified by the parking availability determination module 322. The safety score may comprise a likelihood of a criminal event (e.g., vehicle vandalism) occurring at or nearby a parking space. The safety score may be determined for each available parking space based on the sensor data received by the sensor data reception module 314, the crime data retrieved by the crime data retrieval module 316, the online reviews retrieved by the online review retrieval module 318, and the domain knowledge used by the domain knowledge association module 320. In some examples, the safety score may depend on the date and time that the request for parking assistance is received (e.g., the safety score may depend on time of day or day of the week).

At step 516, the user preference determination module 328 may determine sensitivity to safety of a user (e.g., the driver of the vehicle for which parking assistance is requested). In some examples, the user preference determination module 328 may access a history of past parking spaces in which the user has parked. In these examples, the user preference determination module 328 may determine a safety score of each of the past parking spaces where the user has parked and may determine the user's sensitivity to safety based on the user's parking history.

At step 518, the utility score adjustment module 330 may adjust the initial utility score determined by the utility score determination module 324 for each of the available parking spaces identified by the parking availability determination module 322 based on the safety score of each available parking space determined by the parking safety determination module 326 and the user preference determined by the user preference determination module 328. The utility score adjustment module 330 may adjust the initial utility score to determine an adjusted utility score.

At step 520, the parking space selection module 332 may select a parking space from among the available parking spaces identified by the parking availability determination module 322 based on the adjusted utility score determined by the utility score adjustment module 330. Specifically, the parking space selection module 332 may select the available parking space having the highest adjusted utility score.

At step 522, the route determination module 334 may determine a navigation route between the current location of the vehicle requesting parking assistance and the location of the parking space selected by the parking space selection module 332. At step 524, the data transmission module 336 may transmit the location of the parking space selected by the parking space selection module 332 and/or the navigation route determined by the route determination module 334 to the vehicle requesting parking assistance.

It should now be understood that embodiments described herein are directed to methods and systems for identifying safe parking spaces. A connected vehicle may request parking assistance by transmitting a current vehicle location and a desired destination to a server. The server may receive sensor data from a plurality of connected vehicles to identify available parking spaces within a threshold distance of the desired destination. The server may determine a safety score corresponding to how likely a crime is to occur at each of the identified available parking spaces based on the sensor data received from connected vehicles, crime data associated with the geographic areas in which parking spaces are located, online reviews of parking facilities in which parking spaces are located, and domain knowledge about features of parking spaces that correspond with higher crime.

The server may determine an initial utility score for each of the identified available parking spaces based on a distance between a parking space and the desired destination as well as other features associated with each of the parking spaces. The server may then adjust the initial utility score for each of the parking spaces based on the determined safety scores. The server may also adjust the initial utility score for each of the parking spaces based on a user's safety sensitivity corresponding to how highly a user considers safety when selecting a parking space. In some examples, the server may determine the user's safety sensitivity based on the past parking history of the user.

After determining adjusted utility scores for each of the available parking spaces, the server may select the parking space having the highest adjusted utility score. The server may then determine a navigation route from the current location of the vehicle requesting parking assistance to the location of the selected parking space. The server may then transmit the location of the selected parking space and/or the determined navigation route to the vehicle requesting parking assistance. The driver of the vehicle may then utilize the received navigation route to drive to the selected parking space.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   determining a plurality of available parking spaces within a threshold distance of a destination of a user associated with a vehicle;
   determining an initial utility score for each of the available parking spaces based at least in part on a distance between each of the available parking spaces and the destination;
   determining a safety score associated with each of the available parking spaces based at least in part on crime data and based at least in part on a distance between each of the parking spaces and a major street, an entrance to a parking facility in which each of the available parking spaces is located, or an entrance to a point of interest;
   determining an adjusted utility score for each of the available parking spaces based on the initial utility score for each of the available parking spaces and the safety score associated with each of the available parking spaces;
   selecting a parking space among the plurality of available parking spaces based on the adjusted utility score for the parking space; and
   transmitting a location of the selected parking space to the user.

2. The method of claim 1, further comprising:
   determining a navigation route between a current location of the vehicle and the location of the selected parking space; and
   transmitting the navigation route to the user.

3. The method of claim 1, further comprising:
   receiving one or more online reviews associated with parking facilities in which each of the available parking spaces are located; and
   determining the safety score further based at least in part on the online reviews.

4. The method of claim 3, further comprising:
   determining the safety score further based at least in part on ratings of parking facilities in the online reviews.

5. The method of claim 3, further comprising:
   determining the safety score further based at least in part on comments in the online reviews related to parking facilities in which the available parking spaces are located.

6. The method of claim 1, further comprising:
   receiving a request for parking assistance from the user associated with the vehicle, the request including the destination; and
   determining the safety score further based at least in part on a day of a week when the request for parking assistance is received.

7. The method of claim 1, further comprising:
   receiving a request for parking assistance from the user associated with the vehicle, the request including the destination; and determining the safety score further based at least in part on a time of day when the request for parking assistance is received.

8. The method of claim 1, further comprising:
selecting the parking space among the plurality of available parking spaces further based on a determination that a safety score associated with the parking space is above a threshold.

9. The method of claim 8, wherein the threshold is based on one or more preferences associated with the user.

10. The method of claim 1, further comprising:
determining a sensitivity to safety associated with the user; and
determining the adjusted utility score further based at least in part on the sensitivity to safety associated with the user.

11. The method of claim 10, further comprising:
determining the sensitivity to safety associated with the user based on previous locations where the user has parked.

12. A server comprising a controller configured to:
determine a plurality of available parking spaces within a threshold distance of a destination of a user associated with a vehicle;
determine an initial utility score for each of the available parking spaces based at least in part on a distance between each of the available parking spaces and the destination;
determine a safety score associated with each of the available parking spaces based at least in part on crime data and based at least in part on a distance between each of the parking spaces and a major street, an entrance to a parking facility in which each of the available parking spaces is located, or an entrance to a point of interest;
determine an adjusted utility score for each of the available parking spaces based on the initial utility score for each of the available parking spaces and the safety score associated with each of the available parking spaces;
select a parking space among the plurality of available parking spaces based on the adjusted utility score for the parking space; and
transmit a location of the selected parking space to the user.

13. The server of claim 12, wherein the controller is further configured to:
determine a navigation route between a current location of the vehicle and the location of the selected parking space; and
transmit the navigation route to the user.

14. The server of claim 12, wherein the controller is further configured to:
receive one or more online reviews associated with parking facilities in which each of the available parking spaces are located; and
determine the safety score further based at least in part on the online reviews.

15. The server of claim 12, wherein the controller is further configured to:
receive a request for parking assistance from the user associated with the vehicle, the request including the destination; and
determine the safety score further based at least in part on a day of a week when the request for parking assistance is received.

16. The server of claim 12, wherein the controller is further configured to:
receive a request for parking assistance from the user associated with the vehicle, the request including the destination; and
determine the safety score further based at least in part on a time of day when the request for parking assistance is received.

17. The server of claim 12, wherein the controller is further configured to:
select the parking space among the plurality of available parking spaces further based on a determination that a safety score associated with the parking space is above a threshold.

18. The server of claim 17, wherein the threshold is based on one or more preferences associated with the user.

19. The server of claim 12, wherein the controller is further configured to:
determine a sensitivity to safety associated with the user; and
determine the adjusted utility score further based at least in part on the sensitivity to safety associated with the user.

20. The server of claim 19, wherein the controller is further configured to:
determine the sensitivity to safety associated with the user based on previous locations where the user has parked.

* * * * *

UNITED STATES PATENT AND TRADEMARK OFFICE
CERTIFICATE OF CORRECTION

| | |
|---|---|
| PATENT NO. | : 11,408,745 B2 |
| APPLICATION NO. | : 17/169157 |
| DATED | : August 9, 2022 |
| INVENTOR(S) | : Takamasa Higuchi and Kentaro Oguchi |

It is certified that error appears in the above-identified patent and that said Letters Patent is hereby corrected as shown below:

In the Specification

In Column 2, Line(s) 33, after "number", insert --of--.

Signed and Sealed this
Twenty-fifth Day of April, 2023

*Katherine Kelly Vidal*

Katherine Kelly Vidal
*Director of the United States Patent and Trademark Office*